(12) United States Patent
Doan

(10) Patent No.: US 6,463,982 B1
(45) Date of Patent: Oct. 15, 2002

(54) TIRE INFLATION APPARATUS WITH MULTIPLE INFLATION BELLS

(75) Inventor: Paul George Doan, Macomb, MI (US)

(73) Assignee: Fori Automation, Inc., Shelby Township, MI (US)

( * ) Notice: Subject to any disclaimer, the term of this patent is extended or adjusted under 35 U.S.C. 154(b) by 0 days.

(21) Appl. No.: 09/878,854

(22) Filed: Jun. 11, 2001

(51) Int. Cl.$^7$ .............................................. B60C 25/05
(52) U.S. Cl. ...................................... 157/1.1; 157/1.17
(58) Field of Search ........................... 157/1, 1.1, 1.11, 157/1.17

(56) References Cited

U.S. PATENT DOCUMENTS

| | | | |
|---|---|---|---|
| 2,900,015 A | 8/1959 | Harrison | 157/1.1 |
| 3,461,938 A | 8/1969 | Mueller | 157/1.1 |
| 3,978,903 A | 9/1976 | Mueller et al. | 157/1.2 |
| 4,183,392 A | 1/1980 | Kane | 157/1.1 |
| 4,846,334 A | 7/1989 | Cargould | 198/346.2 |
| 4,947,919 A | 8/1990 | Timlin | 157/1.24 |
| 5,035,274 A | 7/1991 | Kinnick et al. | 157/1.1 |
| 5,072,765 A | 12/1991 | Kane et al. | 157/1.1 |
| 5,094,284 A | 3/1992 | Curcuri | 175/1.17 |
| 5,141,040 A | 8/1992 | Curcuri | 157/1.17 |
| 5,170,828 A | 12/1992 | Curcuri | 158/1 |
| 5,509,456 A | 4/1996 | Bonko et al. | 157/1 |
| 6,029,716 A * | 2/2000 | Hawk | 141/38 |
| 6,148,892 A | 11/2000 | Koerner et al. | 157/1.1 |

* cited by examiner

Primary Examiner—Joseph J. Hail, III
Assistant Examiner—David B. Thomas
(74) Attorney, Agent, or Firm—Reising, Ethington, Barnes, Kisselle, Learman & McCulloch, P.C.

(57) ABSTRACT

A telescoping tire inflation apparatus for inflating wheel-mounted tires having a variety of different diameters and widths without requiring a hardware change. The apparatus includes a bell assembly that moves from a retracted position to an extended position where either an outer bell housing or an inner bell housing engages a larger-sized or smaller-sized wheel-mounted tire, respectively. A controller presets the inner bell housing to either a retracted position wherein the inner bell housing is disposed within the outer bell housing or an extended position where the inner bell housing telescopes downwardly from the outer bell housing. The inner bell housing can be moved to its extended position to push downward upon the sidewall of a relatively smaller-sized wheel-mounted tire, thereby creating a gap between the tire bead and the rim of the wheel through which compressed air supplied to the inner bell housing enters the tire at a high rate. With the inner bell housing in the retracted position the outer bell housing is capable of doing the same for a larger-sized wheel-mounted tire.

26 Claims, 4 Drawing Sheets

TIRE INFLATION APPARATUS WITH MULTIPLE INFLATION BELLS

TECHINCAL FIELD OF THE INVENTION

This invention relates to tire inflation machines used in OEM production line operations, and more particularly to tire inflation machines designed to accommodate different tire sizes.

BACKGROUND OF THE INVENTION

In modern automotive vehicle plants, automated equipment is used to assemble and inflate tires on wheels in preparation for mounting on a vehicle. Prior to inflation, the tire is mounted on the wheel, usually at a separate mounting station, and in some instances the tire is then angularly aligned relative to the wheel to minimize the overall runout of the tire/wheel assembly. See, for example, U.S. Pat. No. 5,826,319 to Colwell et al. At a typical tire inflation station, the uninflated wheel-mounted tire is conveyed onto a stationary tire platen beneath an overhead tire inflation bell. Centering arms then engage the tire and center it into alignment with the overhead inflation bell. The inflation bell is then moved downwardly into engagement with the wheel-mounted tire and inflation air is delivered into the interior of the tire around its inner peripheral bead. The head is then retracted allowing the bead of the tire to seat and seal against the outer peripheral rim of the wheel.

As described in U.S. Pat. No. 6,148,892, issued Nov. 21, 2000 to A. Koerner and hereby incorporated herein by reference, a conveyor belt delivers the wheel-mounted tire to the tire platen (bed) of the tire inflation station. To assist in the alignment of the tire relative to the vertical axis of the inflation bell, the bed may be floated on a cushion of air for near-frictionless centering of the tire.

Although the bed of the typical tire inflation station is capable of handling tires of varying outer diameters, the bell housing is typically limited to tires having a specific inner bead diameter, or rim diameter. In addition, a typical station may be capable of only inflating tires of a single width, with manual adjustment or tool changes being necessary when switching to tires of differing diameter or width. Some approaches for providing automated handling of different sized tires have been proposed. In U.S. Pat. No. 5,509,456 to Bonko et al., a segmented manifold is used to supply the inflation air. The manifold can be expanded radially to accommodate different sizes of tires. U.S. Pat. No. 5,072,765 discloses an auxiliary tire bead depressor for use with an inflation machine to permit a single inflation bell to be used in conjunction with different sized tires. The tire bead depressor comprises a shaft that depresses the tire sidewall at a location between the inflation bell's outer seal ring and the wheel (rim) to prevent premature seating of the bead when the machine is used with a tire and wheel having a relatively small diameter when compared to that of the inflation bell's outer seal ring.

SUMMARY OF THE INVENTION

In accordance with the invention there is provided a tire inflation apparatus for use in sequentially inflating a plurality of wheel-mounted tires that can have differing diameters and/or widths. The apparatus includes a base having a tire platen or other support surface upon which the tire being inflated is first loaded. A first bell housing is supported by the base for movement toward and away from the tire support surface, with the first bell housing moving along an axis between a retracted position and an extended position. A second bell housing is also supported by the base for movement along the axis toward and away from the tire support surface between retracted and extended positions. The first bell housing is used in conjunction with larger-sized wheel-mounted tires and the second bell housing is used with smaller-sized tires. The first bell housing is constructed such that, when in its extended position, it will mate with a larger-sized wheel-mounted tire to thereby define a first air chamber between the tire and first bell housing. The second bell housing is constructed such that, when in its extended position, it will mate with a smaller-sized wheel-mounted tire to thereby define a second air chamber between the tire and second bell housing. The second bell housing is located within the first air chamber when the second bell housing is in its retracted position and the first bell housing is in its extended position. This permits a single compressed air supply tap located within the second bell housing to be used for inflation of both the larger and smaller-sized tires.

Preferably, the first and second bell housings are nested and can extend telescopically, with the first bell housing comprising an outer bell housing the substantially encloses the second, inner bell housing. This can be accomplished using a bell assembly that includes the first and second bell housings along with one or more actuators for telescoping the inner bell housing in and out of the outer bell housing. The bell assembly is supported by the base and is movable as a unit using one or more bell housing actuators. By moving the entire bell assembly with the inner bell housing in its retracted position, the outer bell housing can be moved between from its retracted position into its extended position while the inner bell housing is maintained in its retracted position inside the outer bell housing, and this arrangement permits use of the outer bell housing for inflation of larger-sized tires. Then, for smaller-sized tires, the inner bell housing can be telescoped out of the outer bell housing.

Preferably, a programmable electrical controller controls actuation of the inner bell housing and bell assembly actuators which is dictated by the size or diameter of the tires. Also, the controller establishes the distance between the assembly's extended and retracted positions by taking reference from an elongated linear measurement sensor engaged vertically to the bell assembly. The distance between assembly positions is dictated by the thickness of the tire, or distance between sidewalls. Control of the length of travel of the bell assembly can then be accomplished using one or more hydraulic stops.

An advantage of the present invention is the ability to inflate either a large or small wheel-mounted tire without requiring a manual hardware alteration of the tire inflation apparatus.

BRIEF DESCRIPTION OF THE DRAWINGS

A preferred exemplary embodiment of the present invention will now be described in conjunction with the appended drawings, wherein like numerals denote like elements, and wherein.

DETAILED DESCRIPTION OF THE DRAWINGS

Figure 1:
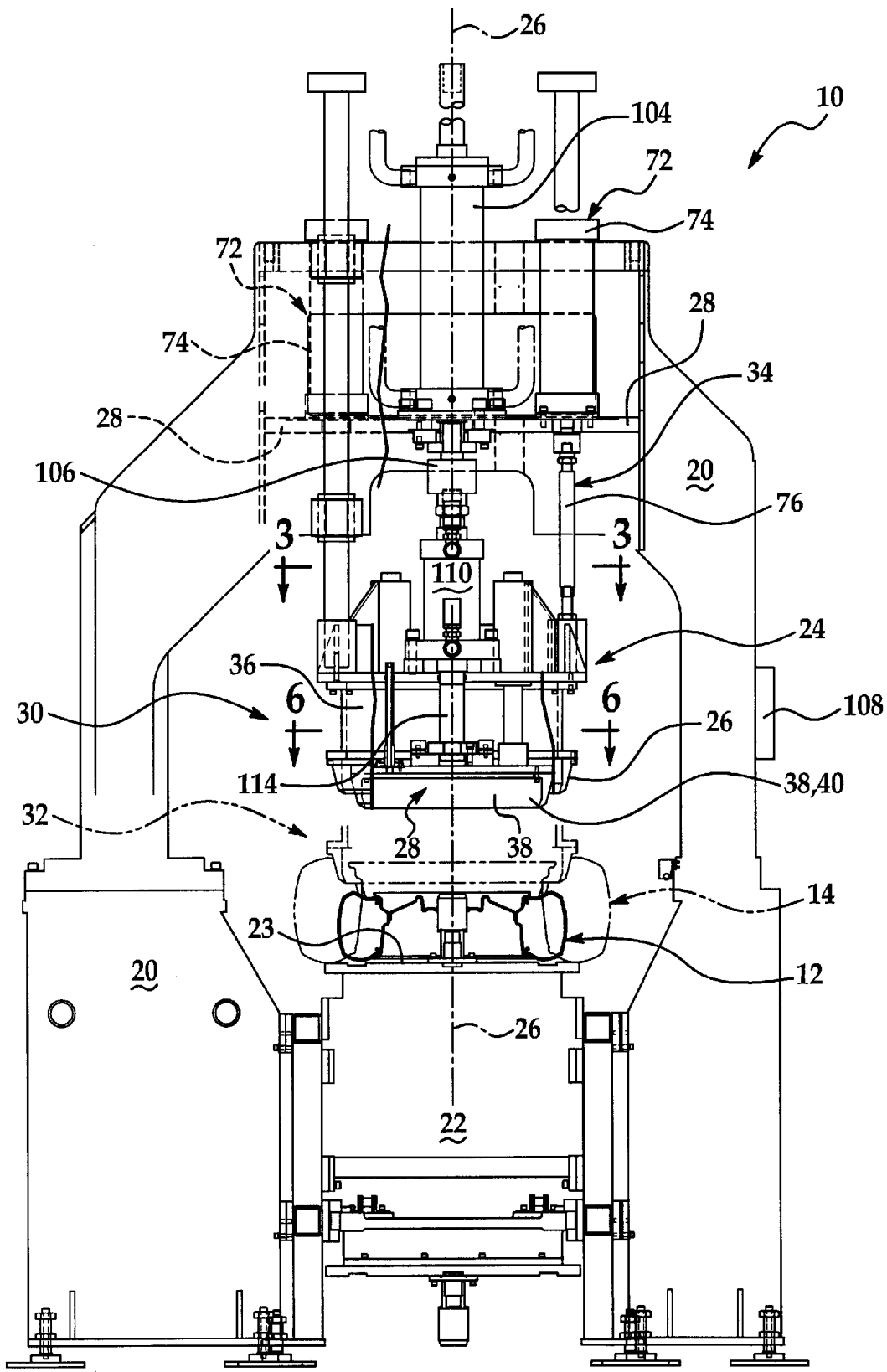
FIG. 1 is a side view, with portions removed to show detail, of a tire inflation apparatus of the present invention.

Referring to FIGS. 1 to 5 of the illustrated embodiment, a high volume tire inflation apparatus 10 is shown as it would be constructed for use in automatically inflating wheel-mounted tires varying in size from a small tire 12 to a large tire 14, without requiring any manual hardware changes. As is common in such machines, inflation air is not blown in through the supplied air valve; instead, a much larger air gap is created by apparatus 10 between the outer peripheral rim 16 of the wheel and an inner peripheral bead 18 of the tire. Pressurized air flows through this gap in the direction indicated by the arrows shown in FIGS. 4 and 5, thereby inflating the tire to a desired pressure. The apparatus 10 has a stationary frame or base 20 which secures and/or levels to a floor on either side of a conveyer belt and centering apparatus 22 that is used to deliver and position the small or large wheel-mounted tire 12, 14 while it is lying substantially flat or horizontally on a tire platen (or other tire support surface) 23.

Figure 2:
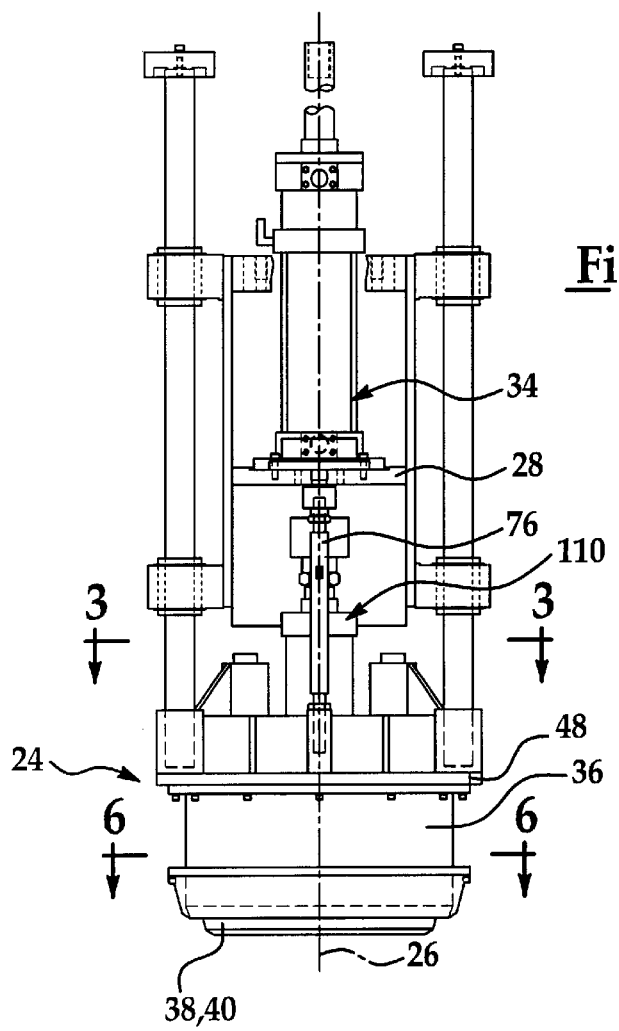
FIG. 2 is a partial side view of the tire inflation apparatus of FIG. 1 rotated 90° about a centerline.
Figure 3:
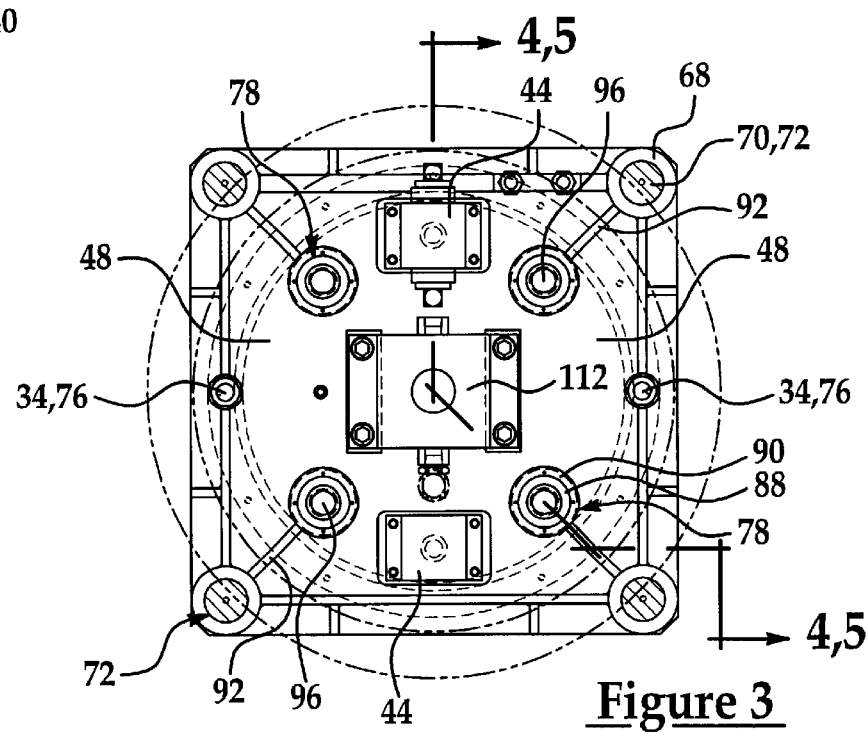
FIG. 3 is a cross section view of the tire inflation apparatus taken along line 3—3 of FIG. 2.
Figure 4:
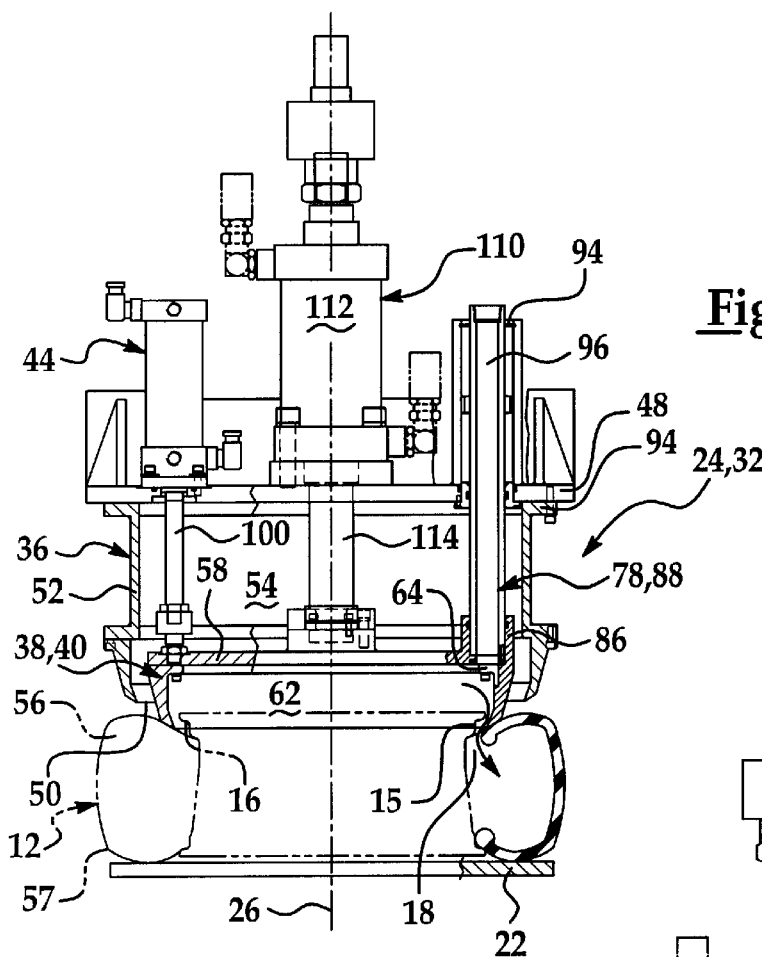
FIG. 4 is a cross section view of the bell assembly of the tire inflation apparatus taken along line 4—4 of FIG. 3, wherein the bell assembly is shown in the extended position and the inner bell housing is shown in an extended position.
Figure 5:
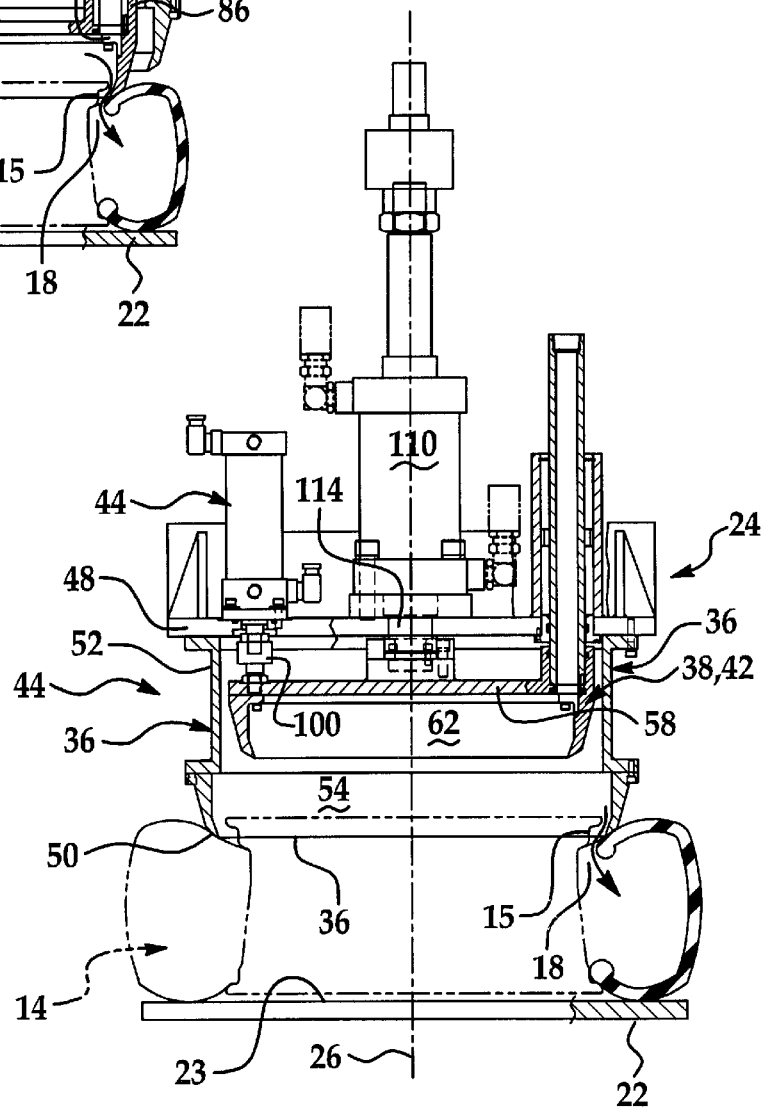
FIG. 5 is a cross section view of a bell assembly of the tire inflation apparatus taken along line 5—5 of FIG. 3, wherein the bell assembly is shown in an extended position and an inner bell housing of the bell assembly is shown in a retracted position.
Figure 6:
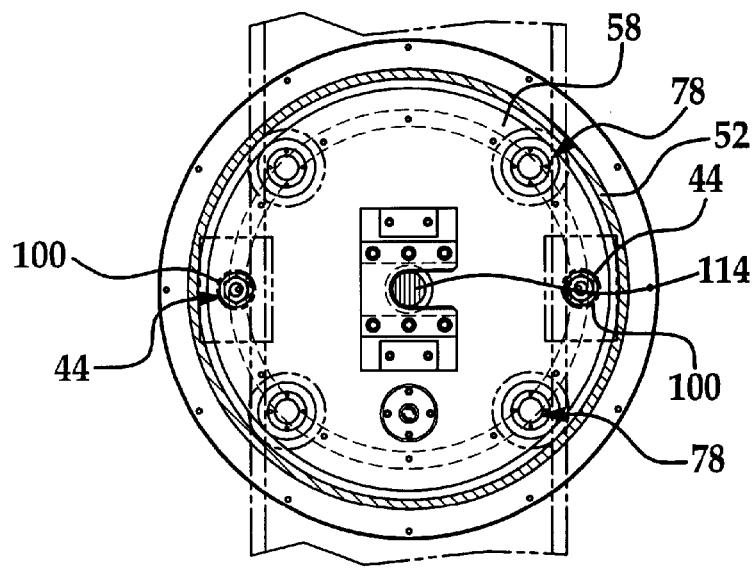
FIG. 6 is a cross section view of the bell assembly taken along line 6—6 of FIG. 2.
Figure 7:
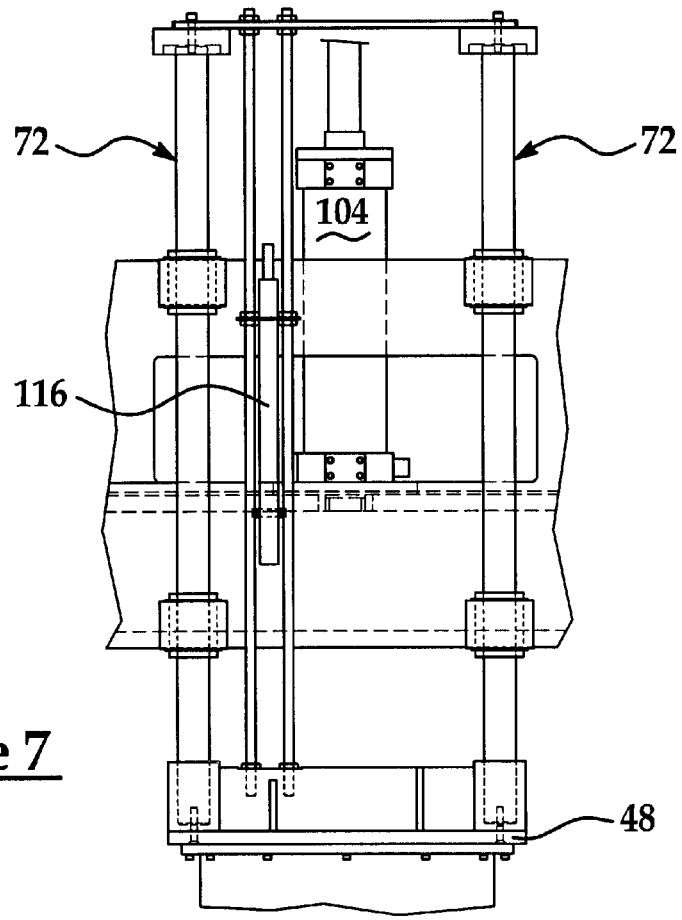
FIG. 7 is a partial side view of the tire inflation apparatus showing a linear measurement transducer.

The tire inflation apparatus 10 includes a bell assembly 24 that extends telescopically downward along a centerline 26 of the centered small or large wheel-mounted tire 12, 14 to engage and inflate the tire. Disposed above the small or large tire 12, 14 is a substantially planar stationary member 28 secured rigidly to the stationary frame 20 and transversing the centerline 26. The bell assembly 24 is suspended beneath the stationary member 28 and above the small or large tire 12, 14. The bell assembly 24 moves axially along the centerline 26 between a tire transfer or retracted position 30 to an extended position 32 (as best shown in FIG. 1) via a pair of diametrically opposing bell assembly actuators 34 (as best shown in FIGS. 2 and 3) engaged between the stationary member 28 and an outer bell housing 36 of the bell assembly 24. The inner bell housing 38 extends to an extended position 40 and retracts to a retracted position 42 with respect to the outer bell housing 36 via a pair of diametrically opposing inner actuators 44, which are offset circumferentially from the bell assembly actuators 34 by ninety degrees, as best shown in FIGS. 4, 5 and 6. Referring to FIG. 1, when the wheel-mounted tires are being transferred to or from the tire inflation apparatus 10, the bell assembly 24 and bell assembly actuators 34 are in the retracted position 30 and the inner bell housing 38 and inner actuators 44 are normally in the extended state 40. As best shown in FIGS. 1 and 4, when the small wheel-mounted tire 12 is being inflated, the bell assembly 24 and bell assembly actuators 34 are in the extended position 32 and the inner bell housing 38 and inner actuators 44 are in the extended state 40. As best shown in FIGS. 1 and 5, when the large wheel-mounted tire 14 is being inflated, the bell assembly 24 and bell assembly actuators 34 are substantially in the extended position 32 and the inner bell housing 38 and inner actuators 44 are in the retracted state 42.

Referring to FIG. 3, the outer bell housing 36 of the bell assembly 24 has a substantially planar square plate 48 which transverses the centerline 26. Engaged rigidly between, and projecting downward from the plate 48 to an outer annular seal ring 50 is a substantially cylindrical skirt 52. The plate 48, skirt 52 and ring 50 define an outer air chamber 54 large enough to envelop the inner bell housing 38. As best shown in FIG. 5, when the bell assembly 24 is in the extended position 32 and the inner bell housing 38 is in the retracted state 42, the outer annular seal ring 50 has pushed down upon an upward facing side wall 56 of the large wheel-mounted tire 14 forcing the tires peripheral bead 18 away from the rim 16 of the wheel, creating the air gap through which compressed air flows enveloping the wheel and tire. The downward force of the air and ring 50 causes the downward facing sidewall 57 of the tire to seal against the bed or centering apparatus 22 thereby allowing the tire to inflate.

Referring to FIGS. 4 and 6, the inner bell housing 38 of the bell assembly 24 has a substantially circular plate 58 which traverses the centerline 26 and has a diameter less than an inner diameter of the outer annular ring 50. An inner annular seal ring 60 projects substantially perpendicular to, and downward from, the peripheral edge of the circular plate 58, thereby defining an inner air chamber 62. When the inner bell housing 38 is in the extended state 40, a substantial portion of the inner annular seal ring 60 projects axially below the outer bell housing 36. When the bell assembly 24 is in the extended position 32 and the inner bell housing 38 is in the extended state 40, the inner annular seal ring 60 has pushed down upon the upward facing side wall 56 of the small wheel-mounted tire 12 forcing the tires peripheral bead 18 away from the rim 16 of the wheel, creating the air gap through which compressed air flows and the small tire inflates as the downward facing sidewall 57 seals against the bed 22.

Feeding compressed air to the inner air chamber 62 are four compressed air supply taps 64 mounted to the plate 66 and spaced circumferentially so that the air flow is quickly and evenly distributed within the tire. Air flows through the taps 64 when the outer or inner bell housings 36, 38 are engaged to the respective large or small tires 14, 12.

Referring to FIGS. 2 and 3, projecting upward from the square plate 48 at each corner is a base sleeve 68 which receives a base rod 70 of a bell assembly linear guide 72. All four of the bell assembly linear guides 72 are parallel to the centerline 26. The guides assure that the bell assembly 24 remains concentric about the centerline 26 and extends and retracts above the wheel-mounted tires 12, 14 squarely and without skewing. Projecting rigidly above the stationary member 28 are four bell assembly guide sleeves 74 each having bores which receive the respective base rod 70 for linear translation there through. The base rods 70 do not penetrate or communicate with the outer or inner air chambers 54, 62.

Each one of the diametrically opposed bell assembly actuators 34 of the bell assembly 24 extend parallel to the centerline 26 and are equally spaced between two adjacent bell assembly linear guides 72. The bell assembly actuator 34 is preferably pneumatic having an encasement mounted to and projecting above the stationary member 28. A cylinder 76 of the bell assembly actuator 34 translates through the stationary member 28 and is engaged at a distal end to the square plate 48 of the bell assembly 24. The cylinder 76 moves downward out of the encasement of the bell assembly actuator 34 to engage the small or large tires 12, 14 and retracts into the encasement of the bell assembly actuator 34 to move the bell assembly 24 back to a tire transfer or retracted position 30 wherein the next wheel-mounted tire 12, 14 is aligned and placed, via the conveyer belt and positioning apparatus 22, for inflation.

Projecting rigidly upward from circular plate 58 of the inner bell housing 38 are four circumferentially spaced inner linear guides 78 which assure that the inner bell housing 38 moves squarely along the centerline 26. Each guide 78 has an inner base sleeve 86 which projects rigidly upward from the circular plate 58. Each inner base sleeve receives an inner rod 88 of the inner linear guide 78 which extends upward through the square plate 48. Projecting rigidly upward from the square plate 48 are four inner guide sleeves 90 disposed concentrically about each respective inner rod 88. The inner guide sleeves 90 are disposed at the four corners of the square plate 48 but radially inward from the base sleeves 68, as best shown in FIG. 3. A plate or reinforcement web 92 interconnects longitudinally the base sleeve 68 to the inner guide sleeve 90 respectively, thereby reinforcing the sleeves and assuring the bell assembly remains aligned and unskewed to the centerline 26 of the wheel-mounted tire 12, 14. To prevent the escape of air from the outer air chamber 54, two circular seals 94 are longitudinally spaced from one-another between the inner guide sleeve 74 and the inner rod 88. The inner rods 88 are preferably hollow thereby forming or defining air passages 96 which communicate through the respective air supply taps 64 creating an evenly distributed and high rate of compressed air to the inner air chamber 62.

Each one of the diametrically opposed inner actuators 44 of the bell assembly 34 extend parallel to the centerline 26 and are equally spaced between two adjacent inner linear guides 78. The inner actuator 44 is preferably pneumatic having an encasement mounted to and projecting above the square plate 48. An inner cylinder 100 of the inner actuator 44 translates through the square plate 48 and is engaged at a distal end to the round plate 58 of the inner bell housing 38 from above. The inner actuators 44 are positioned ninety degrees out of phase from the bell assembly actuators 34, about the centerline 26. The inner cylinder 100 moves downward out of the encasement of the inner actuator 44 to extend the inner bell housing 38 for engagement of the small wheel-mounted tire 12 and retracts into the encasement of the inner actuator 44 to clear the outer bell housing 36 for engagement of the large wheel-mounted tire 14 for inflation.

During inflation of the small or large wheel-mounted tires 12, 14, the influx of compressed air creates an upward force that can exceed ten tons of force. To maintain the positioning of the bell housings in the presence of this force, a bell assembly hydraulic stop 104 is incorporated, which projects rigidly upward from the stationary member 28 and is centered about the centerline 26. The bell assembly hydraulic stop 104 preferably utilizes oil as a fluid and has a cylinder 106 which extends and retracts in unison with the cylinders 76 of the bell assembly actuators 34. When fully extended or retracted, a control valve (not shown) closes, via an electrical signal from a controller 108, to prevent flow of the oil thereby securing the bell assembly 24 in the extended or retracted positions 40, 42. Consequently, the bell assembly hydraulic stop 104 prevents premature upward movement of the bell assembly 24 during inflation of the small or large wheel-mounted tire 12, 14, and assures that the bell assembly 24 remains in the retracted position during transfer of tires to and from the apparatus 10.

An inner hydraulic stop 110 has an encasement 112 which rigidly projects upward from the square plate 48 along the centerline 26. Engaged concentrically to the top of the encasement 112 is the distal end of the cylinder 106 of the bell assembly hydraulic stop 104. Retracting and extending through the square plate 48 is a cylinder 114 of the inner hydraulic stop 110. The distal end of the cylinder 114 is engaged centrally to the circular plate 58 of the inner bell housing 38. The cylinder 114 extends and retracts in unison with the inner cylinder 100 of the inner actuator 44. The inner hydraulic stop 110 engages when the cylinder 100 is in the extended position 32 and the inner bell housing 38 is in the extended position 40 for inflating the small wheel-mounted tire 12. The inner hydraulic stop 110 thereby protects the inner actuator 44 from the upward forces produced by the compressed air during the inflation process.

Operation of the tire inflation apparatus 10 is conducted via the controller 108 which can be a suitable PLC or microprocessor-based computer. For inflating small wheel mounted tires 12, the inner bell housing 38 of the bell assembly 24 is pre-set to the extended position 40 while the bell assembly 24 is in the tire transfer or retracted position 30. The known tire thickness (width), which is dependent upon the vertical distance between sidewalls 56, 57 of the tire, is also provided to the controller. Where the apparatus 10 is used on a production line handling a single size of tire, this information can be pre-set by the operator. Where production involves multiple tire sizes to be run on a single line at one time, the diameter and width data can be supplied to the controller by a separate, upstream controller so that the apparatus knows the relative dimensions for each tire entering the station.

This tire size information will establish which of the bells should be used for inflation as well as the appropriate linear travel of the bell assembly 24 between the retracted and extended positions for the particular tire entering the station. For the smaller-sized tires, the inner bell housing 38 is extended, and this position is maintained by the controller 108 which electrically closes a control valve of the inner hydraulic stop 110 to lock the inner bell housing 38 in the extended position 40. When the centering apparatus 22 positions the tire 12 beneath the bell assembly 24, the controller 108 electrically opens the control valve of the bell assembly hydraulic stop 104. The bell assembly actuators 34 then extend the bell assembly 24 to the extended position 32 established based on the supplied tire width data. For this purpose, position feedback data is provided to the controller 108 from an elongated linear measurement sensor 116 engaged vertically to the bell assembly 24. This feedback data can be compared against a pre-established value related to the width data so that the hydraulic stop 104 is locked once the proper extended position 32 is reached. The hydraulic stop 104 is locked by closing its control valve via the controller 108. Compressed air is then released into the inner bell housing 38, pressurizing the inner air chamber 62 and the small tire 12. Once pressurized, the controller valve of the hydraulic stop 104 opens, and the bell assembly lifts or retracts to the retracted position 30, via the controller 108 and the cycle repeats. The same process occurs for inflation of large wheel-mounted tires 14, except that the inner bell housing 38 is pre-set to the retracted position 42.

Accordingly, it should thus be apparent that there has been provided in accordance with the present invention a tire inflation apparatus that achieves the aims and advantages specified herein. It will of course be understood that the foregoing description is of a preferred exemplary embodiment and that the invention is not limited to the specific embodiment shown. Various changes and modifications will become apparent to those skilled in the art. For example, the hydraulic stops could be eliminated by using actuators capable of withstanding the upward forces produced during the inflation process. In such an embodiment, the actuators could be positioned concentrically to the centerline 26. As another example, the actuators themselves need not be pneumatic, they could be hydraulic or they could be a motored pinion gear or screw rod arrangement. All such changes and modifications are intended to come within the scope of the appended claims.

I claim:

1. A tire inflation apparatus for use in sequentially inflating a plurality of wheel-mounted tires, comprising:

a base that includes a tire support surface for supporting a wheel-mounted tire;

an outer bell housing having an outer annular seal ring closed at one end, the outer bell housing being supported by the base for movement toward and away from the tire support surface, wherein the outer bell housing moves along an axis between a retracted position and an extended position;

an inner bell housing having an inner annular seal ring closed at one end, the inner bell housing being supported by the base for movement toward and away from the tire support surface, wherein the inner bell housing moves along the axis between a retracted position and an extended position;

wherein, when in the extended position, the outer bell housing mates with a larger-sized wheel-mounted tire located on the tire support surface to define an outer air chamber between the larger-sized wheel-mounted tire and the outer closed outer annular seal ring; and wherein, when in the extended position, the inner bell housing mates with a smaller-sized wheel-mounted tire located on the tire support surface to define an inner air chamber between the smaller-sized wheel-mounted tire and the closed inner annular seal ring, and further, wherein the inner bell housing is located within the outer air chamber when the inner bell housing is in the retracted position and the outer bell housing is in the extended position.

2. The apparatus set forth in claim 1, further comprising a compressed air supply tap located within the inner bell housing to supply pressurized air into both the outer and inner air chambers.

3. The apparatus set forth in claim 1, further comprising a bell assembly and at least one bell assembly actuator, wherein the bell assembly includes the outer and inner bell housings and at least one bell housing actuator for the inner bell housing, the outer bell housing being mounted on the bell assembly to move between its retracted and extended positions by actuation of the bell assembly actuator, and the inner bell housing being movable relative to the outer bell housing by actuation of the bell housing actuator.

4. The apparatus set forth in claim 3, wherein the inner bell housing mates with the smaller-sized wheel-mounted tire when the outer and inner bell housings are in their extended positions, whereby the tire inflating apparatus comprises a telescoping tire inflation machine.

5. The apparatus set forth in claim 1, wherein the axis comprises a vertical axis with the bell housings being located above the tire support surface such that the housings move downwardly from the retracted positions to the extended positions.

6. The apparatus set forth in claim 5, wherein the outer and inner bell housings are coaxially located on the axis with the inner bell housing being substantially located within the outer bell housing.

7. The apparatus set forth in claim 1, further comprising a controller, wherein, for each of the wheel-mounted tires, at least one of the extended positions has a location that is selected by the controller using pre-established tire width data associated with that tire.

8. The apparatus set forth in claim 7, wherein the controller sets the extended position of the outer bell housing using the pre-established tire width data.

9. The apparatus set forth in claim 7, further comprising a position sensor connected to the controller to provide the controller with position information indicative of the distance from at least one of the bell housings to the tire support surface.

10. The apparatus set forth in claim 1, further comprising a conveyor for sequentially transferring the wheel-mounted tires onto and off of the tire support surface.

11. A telescoping tire inflation apparatus for use in inflating a plurality of different sized wheel-mounted tires, comprising:

a base that includes a tire support surface for supporting a wheel-mounted tire;

a stationary member spaced from the tire support surface;

a bell assembly having:

an outer bell housing defining an outer air chamber, the outer bell housing having a plate and an outer annular seal ring disposed about a centerline that extends through the tire support surface, the plate being spaced between the stationary member and the tire support surface, the annular seal ring engaged to the plate and being spaced between the plate and the tire support surface, an inner bell housing defining a inner air chamber, the inner bell housing having a inner annular seal ring disposed about the centerline and spaced between the plate of the outer bell housing and the tire support surface, and an inner actuator constructed and arranged to extend and retract the inner bell housing along the centerline between an extended position and a retracted position;

a bell assembly actuator engaged to the stationary member and being constructed and arranged to extend and retract the bell assembly along the centerline between an extended position and a retracted position, wherein the outer annular seal ring engages a large tire and the inner air chamber communicates with the outer air chamber when the inner bell housing is in the retracted position, and wherein the inner annular seal ring engages a small tire when the inner bell housing is in the extended position and the inner air chamber is isolated from the outer air chamber; and a compressed air supply tap extending through the inner bell housing and communicating with the inner air chamber.

12. The apparatus as set forth in claim 11, wherein the bell assembly has an elongated inner linear guide disposed parallel to the centerline, the inner linear guide engaged to the inner bell housing and being projected through the outer bell housing.

13. The apparatus as set forth in claim 12, wherein the inner linear guide has an air passage extended longitudinally through the inner linear guide communicating with the air supply tap.

14. The apparatus as set forth in claim 13, comprising an outer linear guide engaged to the outer bell housing of the bell assembly and projected slideably through the stationary member, the outer linear guide disposed parallel to the centerline.

15. The apparatus as set forth in claim 14, wherein the inner actuator is engaged between the outer bell housing and the inner bell housing.

16. The apparatus as set forth in claim 15, further comprising a bell assembly hydraulic stop engaged telescopically between the stationary member and the bell assembly.

17. The apparatus as set forth in claim 16, comprising:

the bell assembly hydraulic stop having an outer cylinder extending and retracting in a direction parallel to the centerline and in unison with the bell assembly actuator, the outer cylinder having a distal end interconnected rigidly to the bell assembly; and an inner hydraulic stop having an encasement and an inner cylinder, the encasement engaged rigidly between the distal end of the outer cylinder and the horizontal plate of the outer bell housing, the inner cylinder of the inner hydraulic stop extending and retracting in a direction parallel to the centerline from the encasement and through the horizontal plate in unison with the inner actuator, the inner cylinder being engaged to the inner bell housing.

18. The apparatus as set forth in claim 17, wherein the outer and inner actuators are pneumatic cylinders.

19. The apparatus as set forth in claim 18, wherein the bell assembly actuator is one of two bell assembly actuators diametrically opposed about the centerline.

20. The apparatus as set forth in claim 19, wherein the inner actuator is one of two inner actuators diametrically opposed about the centerline.

21. The apparatus as set forth in claim 20, wherein the outer linear guide is one of four outer linear guides spaced circumferentially about and disposed parallel to the centerline.

22. The apparatus as set forth in claim 21, wherein the inner linear guide is one of four inner linear guides spaced circumferentially about and disposed parallel to the centerline.

23. The apparatus as set forth in claim 22, wherein the bell assembly and inner hydraulic stops are centered longitudinally to the centerline.

24. The apparatus as set forth in claim 23, further comprising:

a linear measurement position sensor for adjusting the extended position of the bell assembly which is dependent upon a tire thickness defined parallel to the centerline; and a controller communicating electrically between the position sensor and the bell assembly actuator.

25. The apparatus set forth in claim 11, wherein the inner and outer bell housings are disposed concentrically about the centerline.

26. A tire inflation apparatus for use in sequentially inflating a plurality of wheel-mounted tires, comprising:

a base that includes a tire support surface for supporting a wheel-mounted tire;

an outer bell housing supported by the base for movement toward and away from the tire support surface, wherein the outer bell housing moves along an axis between a retracted position and a tire-engaging, extended position;

an inner bell housing supported by the base for movement toward and away from the tire support surface, wherein the inner bell housing moves along the axis between a retracted position and a tire-engaging, extended position;

wherein the inner bell housing is located within the outer air chamber when the inner bell housing is in the retracted position and the outer bell housing is in the extended position; and wherein the inner bell housing is spaced radially from the outer bell housing when the inner bell housing is in its extended position.

* * * * *